US006357341B1

(12) United States Patent
Watanabe et al.

(10) Patent No.: US 6,357,341 B1
(45) Date of Patent: Mar. 19, 2002

(54) PISTON OF INTERNAL COMBUSTION ENGINE

(75) Inventors: Hiroaki Watanabe; Shingo Motoda, both of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/293,881

(22) Filed: Apr. 19, 1999

(30) Foreign Application Priority Data

Apr. 24, 1998 (JP) .......................................... 10-115443

(51) Int. Cl.[7] .................................................. F16J 1/04
(52) U.S. Cl. ......................... 92/238; 92/239; 123/193.6
(58) Field of Search .......................... 92/186, 212, 239; 123/193.6

(56) References Cited

U.S. PATENT DOCUMENTS 4,158,328 A * 6/1979 Beardmore .................. 92/212
4,274,372 A 6/1981 Kelm et al. ................. 123/193
4,730,549 A * 3/1988 Pfeiffenberger .............. 92/239
5,000,078 A 3/1991 Gabele ........................ 92/228
5,839,352 A * 11/1998 Ribeiro et al. ................ 92/186

FOREIGN PATENT DOCUMENTS

| | | |
|---|---|---|
| DE | 3425965 A1 | 1/1986 |
| DE | 4109160 C3 | 11/2000 |
| JP | 64-3054 | 1/1989 |
| WO | 95/29332 | 11/1995 |

* cited by examiner

*Primary Examiner*—Hoang Nguyen
(74) *Attorney, Agent, or Firm*—Foley & Lardner

(57) ABSTRACT

In a reciprocating piston of an internal combustion engine comprising a piston skirt having a major-thrust-side skirt portion and a minor-thrust-side skirt portion, a projected circumferential width of the minor-thrust-side skirt portion is greater than a projected circumferential width of the major-thrust-side skirt portion. Additionally, the piston skirt is dimensioned so that the minimum thickness of the minor-thrust-side skirt portion is less than the minimum thickness of the major-thrust-side skirt portion.

10 Claims, 8 Drawing Sheets

PISTON OF INTERNAL COMBUSTION ENGINE

BACKGROUND OF THE INVENTION

1. Field of the Invention

The present invention relates to the improvements of a reciprocating piston of an internal combustion engine suitable for automotive vehicles.

2. Description of the Prior Art

In reciprocating pistons used for automotive internal combustion engines, during reciprocating motion of the piston, the piston serves to transmit combustion pressure through a piston pin and a connecting rod to a crank pin and thus convert the combustion pressure into rotational force (torque) of an engine crankshaft. The piston operates with the piston crown or piston head exposed to extremely hot combustion gases, whereas the piston skirt contacts the comparatively cool cylinder wall. This results in a temperature gradient from the top of the piston to the bottom. Generally, the temperature of the piston top exposed to the combustion chamber is higher than that of the piston bottom. Thus, there is a difference of thermal expansion from the top to the bottom. Additionally, the piston moves up and down at high speeds, during engine operation. Of various engine parts, the piston is always subjected to very severe circumstances, namely thermal stresses and mechanical stresses. The piston must have satisfactory durability to live under these severe conditions, while performing its function and while smoothly sliding against the cylinder wall. During the operation of the engine, the resultant force, which is obtained as the product of the combustion pressure applied to the piston crown and the inertia force of the reciprocating engine parts, acts on the piston. With the connecting rod tilted, the resultant force is divided into a component force acting in a direction of the connecting rod, and a component force (called side thrust or major thrust) acting in a thrust direction perpendicular to the direction of action of the resultant force. In order to dispersedly transmit the side thrust acting on the cylinder wall or the cylinder bore, the piston is formed with a piston skirt at both sides of piston pin-boss portions. The greater the circumferential width of the piston skirt, the greater the contact-surface area (or the thrust face) of the piston skirt. With the greater thrust face of the skirt, the side thrust can be effectively dispersed, thus avoiding high localized stresses acting on the cylinder wall. However, the greater the skirt surface area or the circumferential width of the skirt, the greater friction loss during the reciprocating motion of the piston, thus increasing power loss of an internal combustion engine. To balance these two contradictory requirements, that is, increased friction loss and good dispersion of side thrust, there have been proposed and developed various unsymmetrical piston skirt structures where two sides (a major thrust side and a minor thrust side) of the piston skirt are unsymmetrical with respect to the piston pin-boss portions. Such a light-weight piston having an unsymmetrical skirt, has been disclosed in Japanese Utility-model Provisional Publication No. 64-3054 and in U.S. Pat. No. 4,274,372. In the conventional piston structures with an unsymmetrical skirt, as disclosed in the Japanese Utility-model Provisional Publication No. 64-3054 and in the U.S. Pat. No. 4,274,372, a skirt surface area of a major thrust side, on which a comparatively great side thrust acts when the piston descends during the power stroke, is dimensioned to be greater than a skirt surface area of a minor thrust side, on which a comparatively small side thrust acts when the piston moves upwards during the compression stroke, so as to effectively disperse the side thrust force, while, at the same time, reducing friction loss. As is generally known, the differences in thermal expansion between the cylinder and piston during operation, caused by variations in temperature, would change the fit between the cylinder wall and the piston skirt such that it would be either loose to tight. If the fit is too tight, high contact-surface pressure may occur between the cylinder wall and piston skirt owing to thermal expansion, thereby resulting in wear. To reduce undesired cylinder-wall wear or skirt wear and to satisfy various requirements, namely increased flexibility of the skirt in the thrust direction for thermal-expansion control, proper durability (to such an extent that permanent set never takes place under great side thrust), and less possibility of deformity by thermal or mechanical causes, the previously-noted piston structure with an unsymmetrical skirt is often utilized. Referring now to FIG. 11, there is shown a bottom view of a prior art piston 10 with an unsymmetrical skirt, disclosed in the Japanese Utility-model Provisional Publication No. 64-3054. As seen in FIG. 11, the major-thrust-side skirt 20 has a greater circumferential width than a minor-thrust-side skirt 22. The piston 10 is formed integral with two diametrically opposing connecting wall portions (24, 24), each interconnecting one side edge of the major-thrust-side skirt 20 and one side edge of the minor-thrust-side skirt 22 via the associated piston pin-boss portion 18. Each of the connecting wall portions (24, 24) is formed into a substantially circular-arc shape so that each connecting wall portion expands radially outwards. The radius-of-curvature R of each of the connecting wall portions (24, 24) is dimensioned to be greater than the radius of the piston 10. Additionally, the center-of-curvature C of each of the connecting wall portions (24, 24) is offset somewhat to the major thrust side (see the eccentricity E shown in FIG. 11). With the connecting wall portions 24 and 24, each expanding radially outwards, as a whole, the rigidity of the piston (in the radial direction) can be lowered. Therefore, even when the piston experiences interference fit between its side wall and the cylinder wall, the side wall of the piston is able to effectively deflect by virtue of proper flexibility of each connecting wall portion (24, 24), thereby avoiding the contact-surface pressure between the cylinder wall and the piston skirt surface from excessively rising. This reduces undesired cylinder-wall wear or skirt wear. In FIG. 11, reference sign 14 denotes a piston crown portion, whereas reference sign 26 denotes a stiffening rib portion. However, with the previously-noted piston skirt structure, the angle at intersection point between the minor-thrust-side skirt 22 and each of the connecting wall portions (24, 24) is an obtuse angle. Furthermore, in comparison with the major-thrust-side skirt 20, the circumferential width of the minor-thrust-side skirt 22 is short. Thus, the rigidity of the minor-thrust-side skirt 22 remains kept high. On the other hand, both the radially-outward expanded connecting wall portions 24 and 24 contribute to reduction in the radial durability of the piston. Actually, the piston pin-boss portions (18, 18) are located in the middle portion of the respective connecting wall portions (24, 24). Each of the pin-boss portions has a comparatively high rigidity. Probably, it will be impossible to induce adequate deflection of the connecting wall portions.

SUMMARY OF THE INVENTION

Frictional resistance imposed on the piston is broadly classified into (i) a frictional force created between the cylinder wall and the major-thrust-side skirt surface on expansion or power stroke, caused by a relatively great thrust force occurring owing to the combustion pressure, and (ii) a frictional force created between bearing surfaces of the cylinder wall and piston during the intake, compression, and exhaust stroke and caused by inertial force of the reciprocating parts and thermal expansion with less effect of combustion pressure or without providing the effect of combustion pressure. Practically, the engine operation is greatly effected by the frictional resistance applied to the piston at comparatively low engine speeds, and thus the magnitude of thrust force arising from inertia force based the reciprocating motion of the piston is negligibly small, as compared to the magnitude of thrust force occurring on the power stroke. The greater part of the frictional resistance imposed on the piston during the intake, compression, and exhaust stroke can be regarded as a frictional force created between bearing surfaces of the cylinder wall and piston owing to thermal expansion. Through various studies and searches, the inventors of the present invention have analyzed that the sliding resistance of the piston occurs due to frictional resistance between bearing surfaces of the cylinder wall and piston skirt, and additionally the frictional resistance or frictional force can be considered to be equivalent to shearing stresses or shearing force existed in lubricating oil undergoing viscous shear and prevailing between the cylinder wall and the piston skirt, when side thrust force acts in the thrust direction perpendicular to the piston-pin direction. In order to effectively reduce the frictional resistance, it is desirable to provide a means for reducing a normal component of the reaction of the pressure-receiving sliding surface of the piston side wall (or the piston skirt surface), in other words a side thrust force, and also for reducing the surface area of the pressure-receiving sliding surface of the piston skirt for reduced coefficient of friction.

Accordingly, it is an object of the invention to provide a piston of an internal combustion engine which avoids the aforementioned disadvantages of the prior art.

It is another object of the invention to provide a piston of an internal combustion engine, which is capable of reducing friction forces during four strokes of the engine, improving fuel economy, and enhancing engine performance, by reducing a coefficient of friction between the cylinder wall and piston, (that is to say, reduced pressure-receiving sliding surface area of the piston skirt) from the viewpoint of a frictional resistance (or a comparatively large side thrust) imposed on the major thrust side on the power stroke, and by reducing a frictional force created between bearing surfaces of the cylinder wall and the piston skirt owing to thermal expansion from the viewpoint of a frictional resistance imposed on the major thrust side and on the minor thrust side on the intake, compression, and exhaust stroke.

In order to accomplish the aforementioned and other objects of the present invention, a piston of an internal combustion engine comprises a piston crown portion, a pair of piston pin-boss portions, each integrally formed with the piston crown portion and having a piston-pin hole, a piston skirt adapted to be in sliding-contact with a cylinder wall and having a major-thrust-side skirt portion and a minor-thrust-side skirt portion, and a plurality of web-like apron portions, each interconnecting a side edge of either one of the major-thrust-side skirt portion and the minor-thrust-side skirt portion and either one of the pair of piston pin-boss portions, wherein a projected circumferential width of the minor-thrust-side skirt portion is greater than a projected circumferential width of the major-thrust-side skirt portion, and a minimum thickness of the minor-thrust-side skirt portion is less than a minimum thickness of the major-thrust-side skirt portion. It is preferable that the minor-thrust-side skirt portion is dimensioned to satisfy an inequality $W/D \geqq 30.8 \times (T/D)+0.15$, where W denotes the projected circumferential width of the minor-thrust-side skirt portion, D denotes a cylinder bore, and T denotes the minimum thickness of the minor-thrust-side skirt portion. Preferably, each of the major-thrust-side skirt portion and the minor-thrust-side skirt portion may comprise a pair of stiffening rib portions integrally formed on an inside wall thereof and being continuous with associated web-like apron portions of the plurality of web-like apron portions. The pair of stiffening rib portions are spaced from each other by a predetermined projected circumferential width in a direction parallel to an axial line of the piston-pin hole. It is preferable that the pair of stiffening rib portions of the minor-thrust-side skirt portion are located at a lower level than the pair of stiffening rib portions of the major-thrust-side skirt portion with respect to the axial line of the piston-pin hole, and the predetermined circumferential width between the pair of stiffening rib portions of the minor-thrust-side skirt portion is greater than the predetermined circumferential width between the pair of stiffening rib portions of the major-thrust-side skirt portion. Preferably, each of the pair of stiffening rib portions of the major-thrust-side skirt portion and the pair of stiffening rib portions of the minor-thrust-side skirt portion may have a substantially trapezoidal shape in cross section taken in an axial direction of the piston, and a thickness of each of the pair of stiffening rib portions of the major-thrust-side skirt portion and the pair of stiffening rib portions of the minor-thrust-side skirt portion is gradually decreased towards an innermost end thereof in a circumferential direction of the piston. The piston may further comprise a slit which is formed in the back of a lowermost piston ring groove of the plurality of piston ring grooves and located in a side of the piston corresponding to the minor-thrust-side skirt portion so that the slit penetrates a side wall of the piston.

DESCRIPTION OF THE PREFERRED EMBODIMENTS

Figure 1:
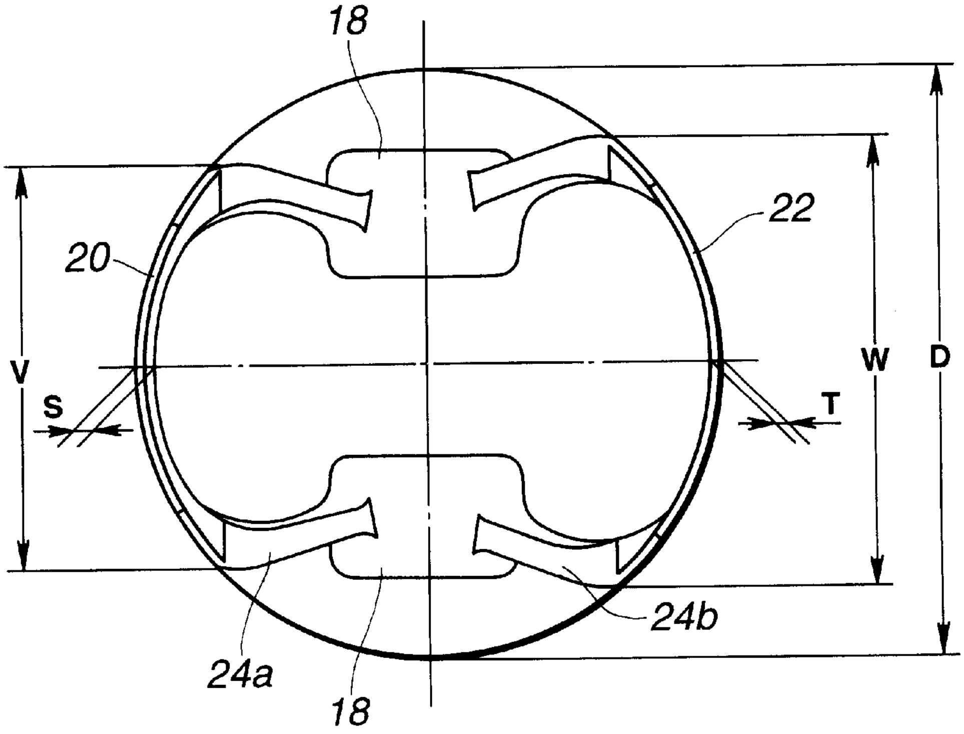
FIG. 1 is a bottom view illustrating a first embodiment of a piston of an internal combustion engine of the invention.
Figure 2:
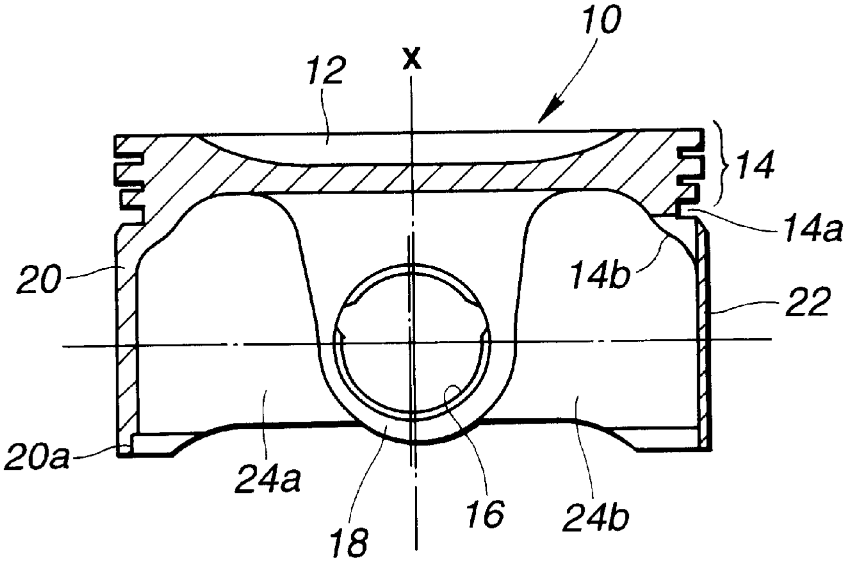
FIG. 2 is a longitudinal cross section of the piston of the first embodiment shown in FIG. 1.
Figure 3:
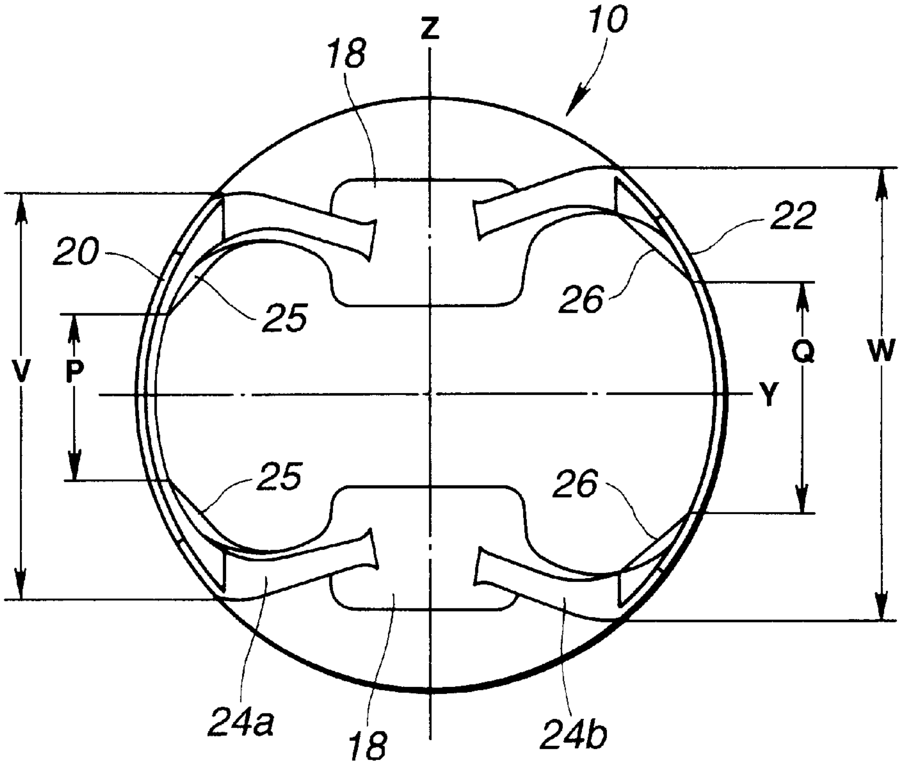
FIG. 3 is a bottom view illustrating a second embodiment of a piston of an internal combustion engine of the invention.

Referring now to the drawings, particularly to FIGS. 1 and 2, a piston 10 of the embodiment is formed into a substantially inverted cup-like shape. The piston 10 of the first embodiment comprises a piston crown portion or a piston head portion 14 constructing a top face of the piston, a pair of piston pin-boss portions (18, 18), a major-thrust-side skirt portion 20, a minor-thrust-side skirt portion 22, and web-like apron portions 24*a* and 24*b*. The piston pin-boss portions (18, 18) are located on the underside of the piston crown portion 14, and integrally formed with the piston crown portion so that the pin-boss portions (18, 18) are spaced apart from each other in the axial direction of a piston pin or a gudgeon pin (not shown). Each of the piston pin-boss portions (18, 18) has a piston-pin bore or piston-pin hole 16 to which the piston pin is loosely fitted. The major-thrust-side skirt portion 20 and the minor-thrust-side skirt portion 22 are formed integral with the piston crown portion 14 so that the major-thrust-side skirt portion 20 and the minor-thrust-side skirt portion 22 oppose to each other in the thrust direction perpendicular to the piston-pin direction. Both side edges of the major-thrust-side skirt portion 20 are continued with the piston pin-boss portions (18, 18) via the web-like apron portions 24*a*, whereas both side edges of the minor-thrust-side skirt portion 22 are continued with the piston pin-boss portions (18, 18) via the web-like apron portions 24*b*. In the shown embodiment, the piston crown portion 14, the piston pin-boss portions (18, 18), the major-thrust-side skirt portion 20, the minor-thrust-side skirt portion 22, and the plurality of web-like apron portions 24*a* and 24*b* are integrally formed with each other by way of metallic molds or die forming. Each of the major-thrust-side skirt portion 20 and the minor-thrust-side skirt portion 22 has a substantially same curvature as the outside circumference of the piston head 14 (or the side wall of the upper portion of the piston). That is, each of the major-thrust-side skirt portion 20 and the minor-thrust-side skirt portion 22 is formed in an oval shape of a predetermined ovality. Note that, in the embodiment, the thickness T of the minor-thrust-side skirt portion 22 is dimensioned to be thinner than the thickness S of the major-thrust-side skirt portion 20, and that the circumferential width W of the minor-thrust-side skirt portion 22 is dimensioned to be greater than the circumferential width V of the major-thrust-side skirt portion 20. In the shown embodiment, the dimension relationship of the minor-thrust-side skirt portion 22, particularly the relationship between a ratio W/D and a ratio T/D, is defined by the following inequality (1).

$$W/D \geqq 30.8 \times (T/D) + 0.15 \qquad (1)$$

where W denotes a projected circumferential width of the minor-thrust-side skirt portion 22, D denotes a cylinder bore, and T denotes the minimum wall thickness of the minor-thrust-side skirt portion 22.

Figure 9:
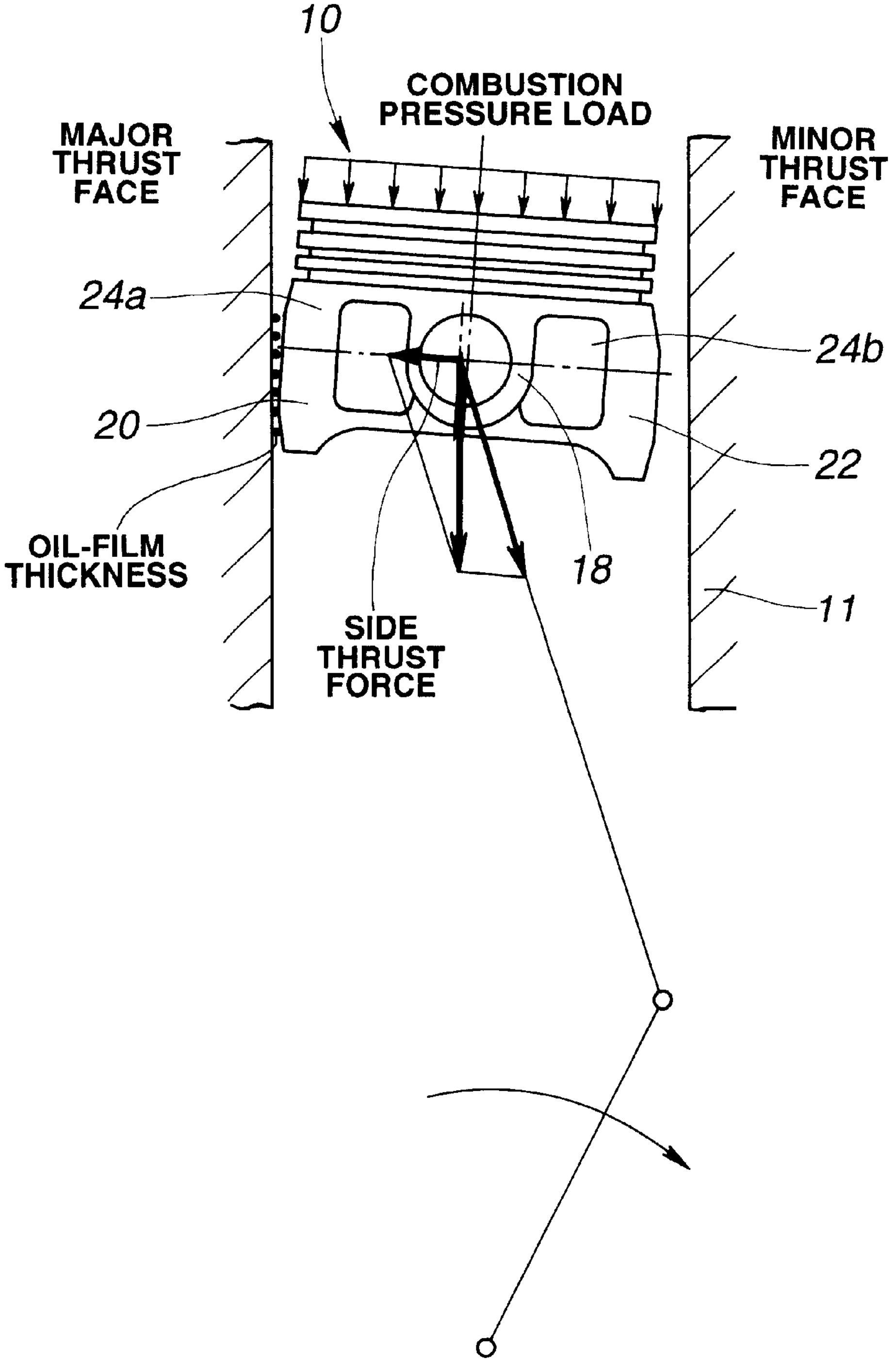
FIG. 9 is an explanatory view showing the behavior of the piston of the invention on the power stroke.

On the other hand, the circumferential width V and the thickness S of the major-thrust-side skirt portion 20 are determined or set, so that excessive deformation of the major-thrust-side skirt portion 20 never occurs, when a great thrust force acts on the major thrust face owing to combustion pressure load created on the power stroke (or the expansion stroke) shown in FIG. 9. As discussed above, the major-thrust-side skirt portion 20 is formed to be comparatively thick (in wall thickness) and narrow (in circumferential width), thereby avoiding excessive enlargement of the pressure-receiving sliding surface area of the major-thrust-side skirt portion 20 against the cylinder wall or the cylinder bore 11. The reduced pressure-receiving sliding surface area of the major-thrust-side skirt portion 20 permits an oil film built up between the cylinder wall and the skirt surface of the major-thrust-side skirt portion 20 to be held at a predetermined film thickness. In other words, the shape and dimensions (the comparatively-decreased projected circumferential width V and the comparatively-increased thickness S) of the major-thrust-side skirt portion 20 are determined to maintain a hydrodynamic oil film between the cylinder wall and the skirt surface of the major-thrust-side skirt portion 20 and to prevent the occurrence of boundary lubrication (corresponding to a lubricating condition that is a combination of metal-to-metal surface contact and lubricating-oil-film shear). The above-mentioned structure of the major-thrust-side skirt portion 20 contributes to reduction in frictional resistance.

As compared with the major-thrust-side skirt portion 20, the projected circumferential width W of the minor-thrust-side skirt portion 22 is dimensioned to be somewhat wide, and additionally the wall thickness T of the minor-thrust-side skirt portion 22 is dimensioned to be somewhat thin. That is to say, the rigidity of the minor-thrust-side skirt portion 22 is properly intendedly lowered so as to provide increased flexibility. As clearly seen in FIG. 10, the reaction (the minor thrust) of the pressure-receiving sliding surface of the minor-thrust-side skirt portion 22, bearing against the cylinder wall or the cylinder bore 11, takes place on the intake, compression, and exhaust stroke. The input source of the minor thrust is a thrust force resulting from an inertial force of the reciprocating piston and piston pin, and a thrust force resulting from thermal expansion of the piston skirt portion. As discussed above, of the previously-noted two sorts of thrust forces, the latter thrust force (occurring owing to the thermal expansion) forms a large majority of the frictional resistance imposed on the piston during the intake, compression, and exhaust stroke. As can be appreciated, in presence of the increase in a thrust force occurring due to the thermal expansion of the piston skirt portion, it is possible to prevent or suppress excessive rise in the thrust force imposed on the minor-thrust-side skirt portion 22 by way of easy deformation of the minor-thrust-side skirt portion 22 of a properly-reduced rigidity (that is, a properly-enhanced flexibility). The fact that the thrust force, occurring owing to the thermal expansion, forms the greater part of the frictional resistance imposed on the piston during the intake, compression, and exhaust stroke, is able to be substantiated by the facts that a thrust-force component arising from inertial force based on the reciprocating piston and piston pin is negligibly small within a practical engine speed range (low engine speed range) wherein the frictional resistance imposed on the piston must be taken into account, and that the reaction of oil film becomes maximum at the crank angle of approximately 90 degrees after top dead center (T.D.C.), that is, at a timing where a piston speed (a velocity of reciprocating motion of the piston) becomes maximum (see FIG. 10). This is because the shearing force existed in lubricating oil undergoing viscous shear and prevailing between the cylinder wall and the piston skirt becomes maximum when the velocity of the reciprocating piston becomes maximum on the assumption that load acting on the pressure-receiving sliding surface of the piston skirt surface is fixed to a constant value, and as a result the frictional force necessarily becomes maximum at the timing of the maximum velocity of the sliding piston. The smaller the thrust force (or the side thrust force), the smaller the frictional force imposed on the piston, since the frictional resistance or frictional force of the piston is basically obtained by multiplying the thrust force by a coefficient of friction. With the piston skirt structure of the embodiment, it is advantageous to reduce the frictional force or frictional resistance imposed on the piston by suppressing the increase in side thrust force created by thermal expansion of the piston on the intake, compression, and exhaust stroke by way of properly-reduced rigidity of the minor-thrust-side skirt portion 22, since the properly-increased flexibility of the minor-thrust-side skirt portion 22 ensures a smooth reciprocating motion of the piston as well as a proper expansion control of the lower portion of the piston. The deformability of the minor-thrust-side skirt portion 22 is determined depending upon the wall thickness T of the skirt portion 22, the circumferential width of the skirt portion 22 extending from one of the web-like apron portions 24*b* to the other, and the axial length of the skirt portion 22. Of these factors, namely the wall thickness T, the circumferential width, and the axial length, the decrease in the axial length of the skirt portion is effective to reduce the frictional force imposed on the piston. However, excessive reduction in the axial length of the skirt portion deteriorates the behavior or reciprocating motion of the piston during engine operation. Actually, excessively-reduced axial length of the skirt portion is unpreferable or undesirable in reducing piston slapping noise. Thus, the axial length of the skirt portion must be set at a proper axial length from the viewpoint of the piston slap noise-reduction performance. For the purpose of assuring a satisfactory deformability of the minor-thrust-side skirt portion 22, when aiming at both the wall thickness and the circumferential width of the skirt portion, the thinner the wall thickness of the skirt portion becomes, the more easily the skirt portion is deformable or deflectable. Also, it is impossible to reduce the thickness of the skirt portion to below a lower limit determined or constrained by possible manufacturing techniques in case of a greater piston diameter. On the other hand, the web-like apron portions serve as a supporting portion for supporting the skirt portion when the load is imposed on the skirt portion, and thus the apron portions must be thick-walled for providing a skirt supporting portion of an adequate mechanical strength. As regards the thickness of the skirt portion, an actual region where the skirt portion 22 is able to be thin-walled is limited by the apron portions 24*b*. For the reasons set out above, in reducing the rigidity of the skirt portion, it is necessary to provide and ensure a predetermined skirt width (or a predetermined circumferential width of the skirt portion 22). In accordance with results of measurement of frictional forces during engine running while igniting air-fuel mixture, experimentally assured by the inventors of the present invention, the reducing effect of the frictional force is very little if the rigidity of the minor-thrust-side skirt portion 22 is reduced to a slight degree. The inventors of the invention have discovered that it's possible to obtain a remarkable reduction effect of the frictional force, when the rigidity of the minor-thrust-side skirt portion 22 is dropped or reduced to a level defined by the previously-described inequality (1) indicative of the specified dimension relationship of the minor-thrust-side skirt portion 22.

Figure 4:
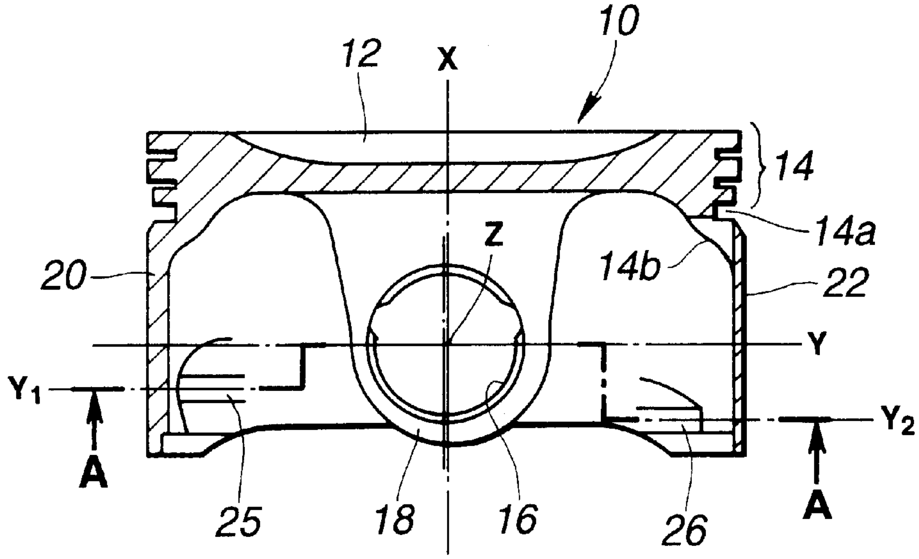
FIG. 4 is a longitudinal cross section of the piston of the second embodiment shown in FIG. 3.
Figure 5:
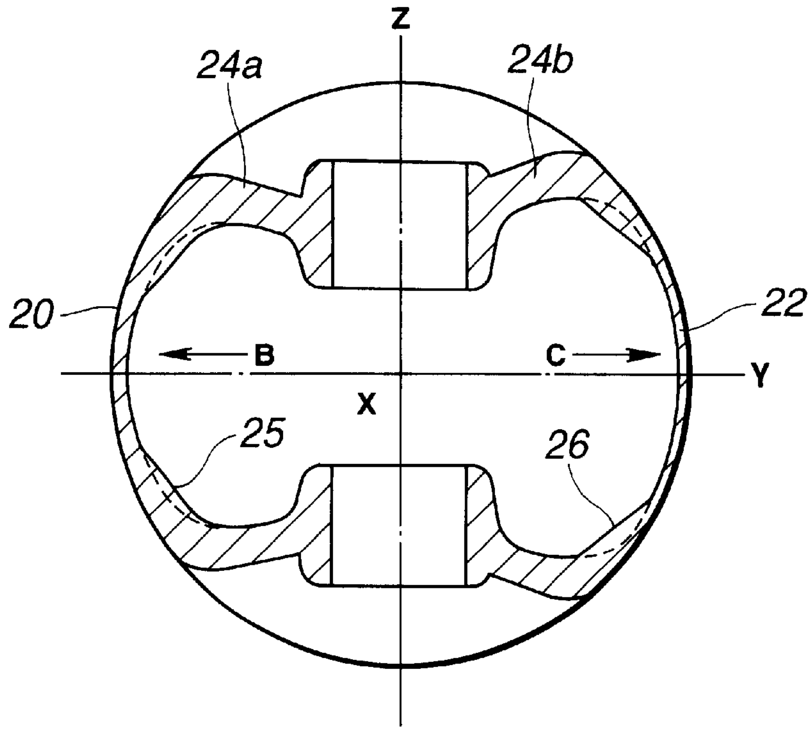
FIG. 5 is a lateral cross section taken along the line A—A of FIG. 4.
Figure 6A:
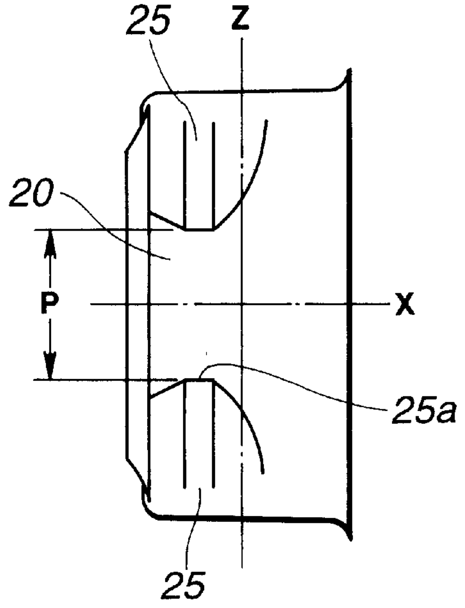
FIG. 6A is an inside view of the piston, taken in the direction of the arrow B shown in FIG. 5.
Figure 6B:
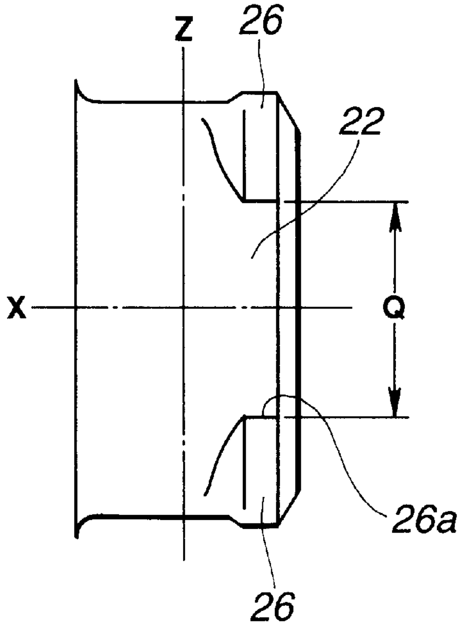
FIG. 6B is an inside view of the piston, taken in the direction of the arrow C shown in FIG. 5.
Figure 7A:
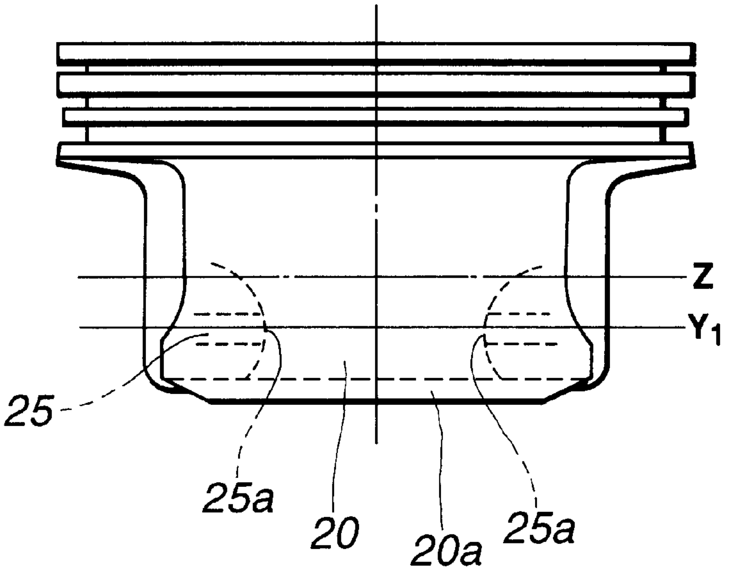
FIG. 7A is a side view of the piston of the second embodiment, as viewed from the major thrust side.
Figure 7B:
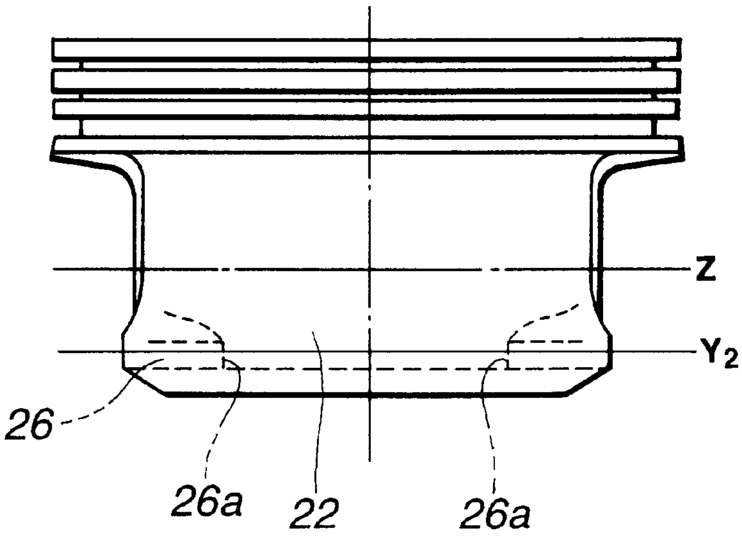
FIG. 7B is a side view of the piston of the second embodiment, as viewed from the minor thrust side.
Figure 10:
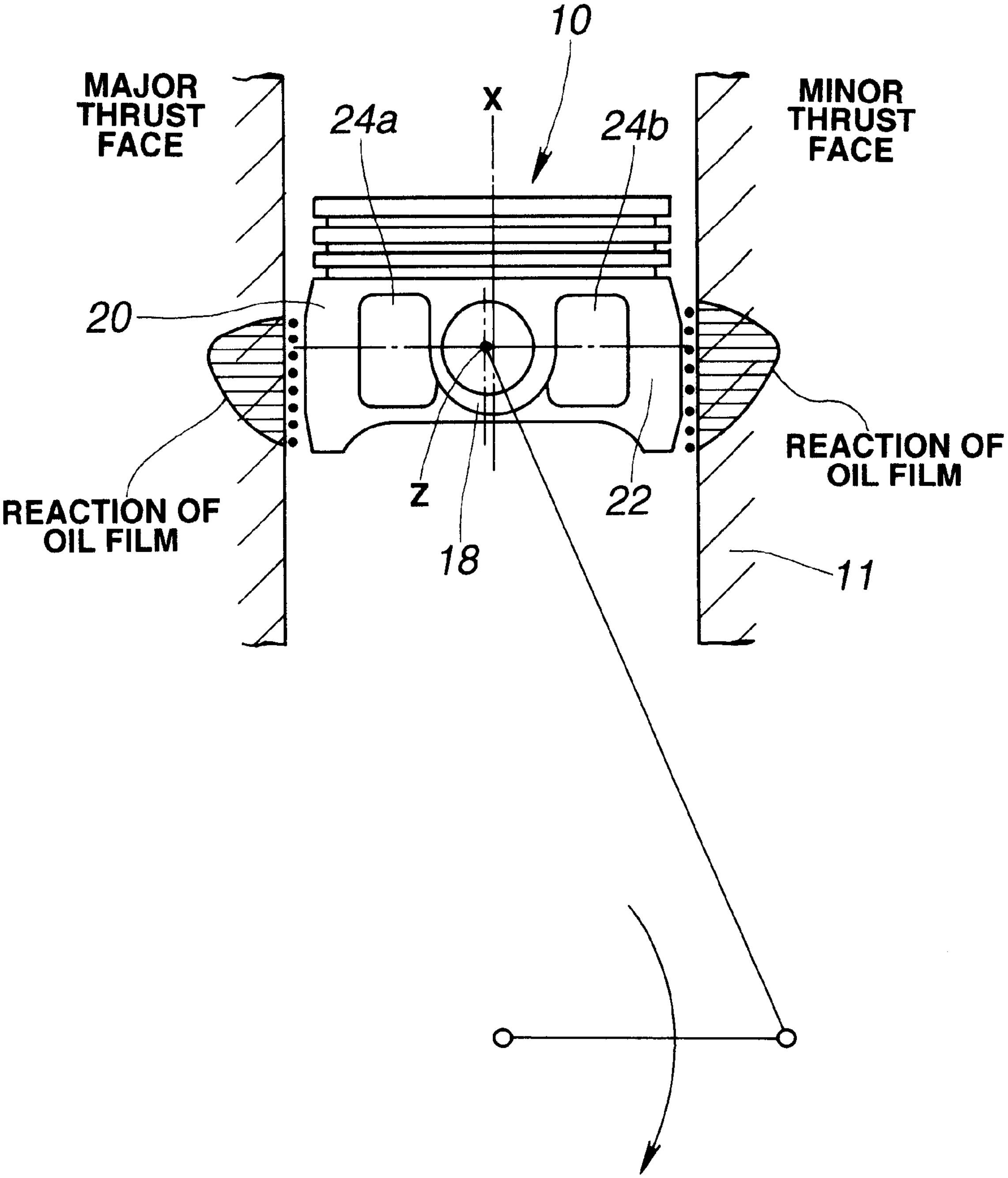
FIG. 10 is an explanatory view showing the behavior of the piston of the invention on the intake, compression, and exhaust stroke.
Figure 11:
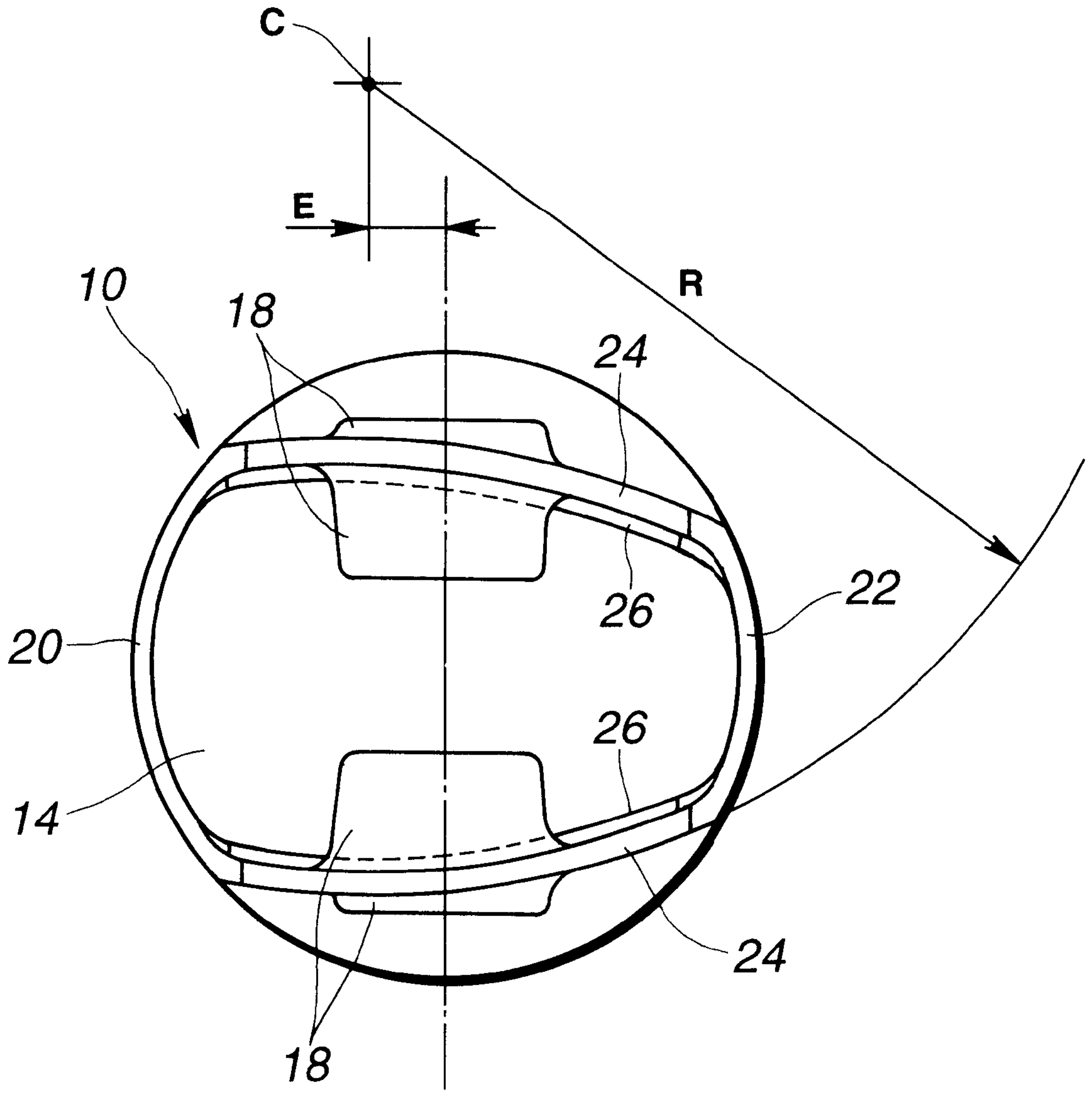
FIG. 11 (PRIOR ART)
FIG. 11 is a bottom view of a piston with an unsymmetrical skirt structure of the prior art.

Referring now to FIGS. 3, 4, 5, 6A, 6B, 7A and 7B, there is shown a second embodiment of a piston of the invention. The piston of the second embodiment of FIGS. 3–7B is similar to the piston of the first embodiment of FIGS. 1 and 2, except that stiffening rib portions or reinforcing rib portions 25 and 26 are further provided on inner peripheral wall surfaces of the respective skirt portions 20 and 22. Thus, the same reference signs used to designate elements in the piston of the first embodiment shown in FIGS. 1 and 2 will be applied to the corresponding elements used in the second embodiment shown in FIGS. 3–7B, for the purpose of comparison of the first and second embodiments. In the piston of the second embodiment, a pair of major-thrust-side stiffening rib portions (25, 25) are integrally formed on the inner peripheral wall of the major-thrust-side skirt portion 20 such that relatively thick-walled ends of the major-thrust-side stiffening rib portions (25, 25) are continuous with the respective web-like apron portions (24*a*, 24*a*). Likewise, a pair of minor-thrust-side stiffening rib portions (26, 26) are integrally formed on the inner peripheral wall of the minor-thrust-side skirt portion 22 such that relatively thick-walled ends of the minor-thrust-side stiffening rib portions (26, 26) are continuous with the respective web-like apron portions (24*b*, 24*b*). The two major-thrust-side stiffening rib portions (25, 25) are spaced apart from each other by a predetermined projected circumferential distance or width P in a direction parallel to the axial line Z of the piston-pin hole 16, whereas the two minor-thrust-side stiffening rib portions (26, 26) are spaced apart from each other by a predetermined projected circumferential distance or width Q in a direction parallel to the axial line Z of the piston-pin hole 16. Additionally, the two minor-thrust-side stiffening rib portions (25, 25: 26, 26) of each of the major-thrust-side skirt portion and the minor-thrust-side skirt portion are symmetrical with respect to the plane XY containing the axial line X of the piston and the line Y normal to the axial line Z of the piston-pin hole 16 (see FIGS. 3, 5, 6A and 6B). In FIG. 4, Y1 indicates a centerline of each of the major-thrust-side stiffening rib portions (25, 25) in the circumferential direction, while Y2 indicates a centerline of each of the minor-thrust-side stiffening rib portions (26, 26). As seen in FIG. 4, the minor-thrust-side stiffening rib portions (26, 26) are located at a lower level rather than the major-thrust-side stiffening rib portions (25, 25) with respect to the axial line Z of the piston-pin hole 16 (see the difference of levels of the two lines Y1 and Y2 shown in FIG. 4). Furthermore, in the piston structure of the second embodiment, the minor-thrust-side stiffening rib portions (25, 25) and the major-thrust-side stiffening rib portions (26, 26) are dimensioned so that the circumferential distance Q between the minor-thrust-side stiffening rib portions (26, 26) is greater than the circumferential distance P between the major-thrust-side stiffening rib portions (25, 25). Each of the stiffening rib portions 25 and 26 has a substantially trapezoidal shape in longitudinal cross section taken in the axial direction of the piston 10. The flat upper face (corresponding to an upper base of the trapezoid) of the major-thrust-side stiffening rib portion 25 is dimensioned so that the thickness of the flat opper face is gradually decreased towards the innermost en 25*a* of the major-thrust-side stiffening portion 25. The innermost end 25*a* of each of the major-thrust-side stiffening rib portions (25, 25) is formed into a circular-arc shape and continually smoothy connected to the inside wall surface of the major-thrust-side skirt portion 20. In the same manner, the flat upper face of the minor-thrust-side stiffening rib portion 26 is dimensioned so that the thickness of the flat upper face is gradually decreased towards the innermost en 26*a* of the minor-thrust-side stiffening rib portion 26. The innermost end 26*a* of each of the minor-thrust-side stiffenig rib portions (26, 26) is formed into a circular-arc shape and continuosly smoothly connected to the iside wall of the minor-thrust-side skirt portion 22. With the previously-explained pisto structure of the second embodiment, as regards the major-thrust-side skirt portio 20 requiring a comparatively high rigidity, the major-thrust-side stiffening rib portion 25 is located at a lower level than the plane YZ containing the axial line Z of the piston-pin hole 16 and the line Y perpendicular to the axial line Z, and located at a higher level than the minor-thrust-side stiffening rib portion 26. Thus, the rigidity of the part of the major-thrust-side skirt portion 20 near ther plane YZ is relatively enhanced, thereby suppresing undesirable deformation or deflection of the major-thrust-side skirt portion 20. This effectively avoids excessive enlargement of the pressure-receiving sliding surface area of the major-thrust-side skirt portion 20, during the engine operation. On the other hand, as regards the minor-thrust-side skirt portion 22 requiring a comparatively low rigidity, the minor-thrust-side stiffening rib portion 26 is located at a lower level tha the plane YZ, and located at a lower level than the major-thrust-side stiffening rib portion 25. Moreover, the innermost ends (26*a*, 26*a*) of minor-thrust-side stiffening rib portion (26, 26) are spaced apart from each other by the circumferential distance Q greater than the circumferential distance P between the innermost ends (25*a*, 25*a*) of the major-thrust-side stiffening rib portions (25, 25). Therefore, the skirt area of the minimum wall tickness T axists widely within below the plane YZ (particularly at slightlylower zone compared to the plane Yz containing the axial line Z of the piston-pin hole 16), and thus the rigidity of part of the minor-thrust-side skirt portion 22 near the plane Yz is relatively reduced. This ensures proper deformation or easy deflection of the minor-thrust-side skirt portion 22 during the engine operation (or the reciprocating motion of the piston). As seen in FIG. 10, a point of the maximum reaction of lubricating oil film, occurring owing to thermal expansion, exists in a slightly lower position or zone than the plane YZ containing the axial line Z of the piston-pin hole 16. As discussed above, the properly-reduced rigidity (or the suitably-increased flexibility) of the minor-thrust-side skirt portion 22 is very effective to suppress the increase in a side thrust force imposed on the minor-thrust-side skirt portion 22.

Figure 8:
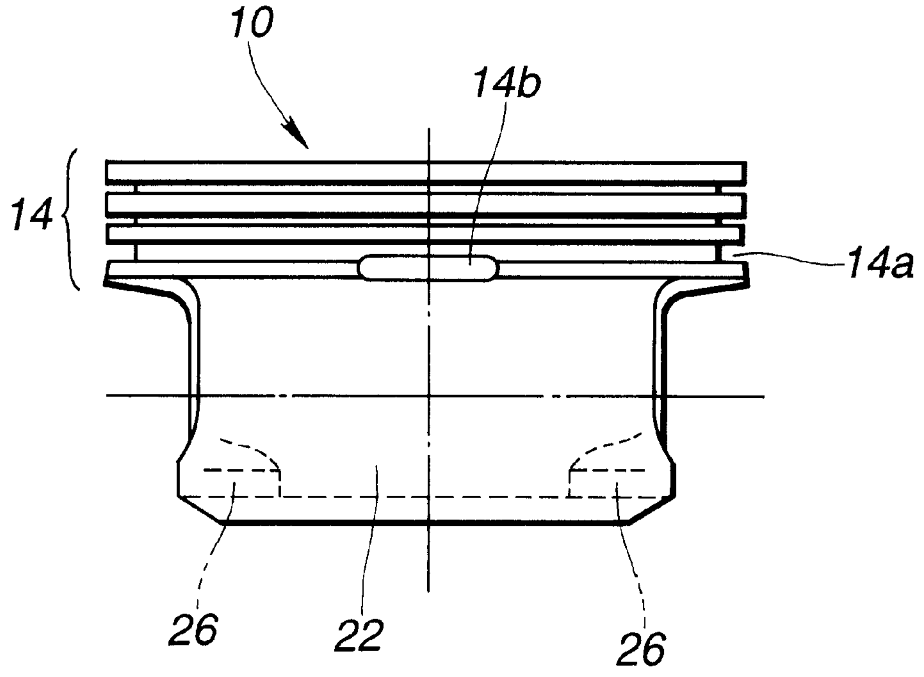
FIG. 8 is a side view of a piston of a third embodiment.

Referring now to FIG. 8, there is shown a third embodiment of the piston of the invention. In addition to the piston structure discussed in the first and second embodiments, the piston of the third embodiment further comprises a slit 14*b* (or a slot). As seen in FIG. 8, the piston 10 has a plurality of piston ring grooves. The slit 14*b* is formed in the back or the bottom of the lowermost piston ring groove 14*a* of the plurality of piston ring grooves formed in the periphery of the piston crown portion 14 of the piston 10, and located in a side of the piston corresponding to the minor-thrust-side skirt portion 22. The provision of the slit 14*b* penetrating the side wall of the piston is effective to further lower the rigidity of the minor-thrust-side skirt portion 22, in other words, to further increase the flexibility of the skirt portion 22, thus ensuring a more great reducing effect of a frictional force acting between bearing surfaces of the cylinder wall and the side wall of the piston. Also, the effect of thermal expansion and side thrust can be lessened by the more increased flexibility of the minor-thrust-side skirt portion 22, and as a result the behavior of the piston is stabilized and piston slapping noise is effectively reduced. Usually, an oil control ring is fitted to the lowermost piston ring groove 14*a*. Thus, the slit 14*b*, formed in the back of the lowermost ring groove 14*a*, also serves as an oil-returning slot. The total weight of the piston 19 can be somewhat reduced by the formation of the slit 14*b*.

As will be appreciated from the above, according to the piston structure of the invention, the projected circumferential width of the minor-thrust-side skirt portion is dimensioned to be wider than that of the major-thrust-side skirt portion, and additionally the minimum thickness of the minor-thrust-side skirt portion is dimensioned to be thinner than that of the major-thrust-side skirt portion, and thus, in the major-thrust-side skirt portion, the pressure-receiving surface area can be relatively reduced due to a higher rigidity than the minor-thrust-side skirt portion. This attains effective reduction in a frictional force caused by the major side thrust force which forms a large majority of the frictional resistance imposed on the piston during the power stroke. In contrast to the above, in the minor-thrust-side skirt portion, the properly-increased flexibility ensures proper, easy deformation of the minor thrust side, thus achieving effective reduction in a thrust force occurring owing to the thermal expansion which thrust force forms a large majority of the frictional resistance imposed on the piston during the intake, compression, and exhaust stroke. As a consequence, the frictional resistance created between the bearing surfaces of the cylinder wall and the side wall of the piston can be effectively reduced all over the four strokes, thereby improving fuel economy and enhancing the engine performance. Furthermore, the minor-thrust-side skirt portion is dimensioned to satisfy an inequality $W/D \geqq 30.8\times(T/D)+0.15$, where W denotes a projected circumferential width of the minor-thrust-side skirt portion, D denotes a cylinder bore, and T denotes the minimum wall thickness of the minor-thrust-side skirt portion. It is possible to induce a superior reducing effect of the frictional resistance (the thrust force) occurring owing to the thermal expansion on the intake, compression, and exhaust stroke, by dropping the rigidity of the minor-thrust-side skirt portion down to a rigidity level defined by the aforementioned inequality. Moreover, in the previously-discussed second embodiment, the circumferential distance or width Q of innermost ends of a pair of inside stiffening rib portions of the minor-thrust-side skirt portion is dimensioned to be greater than the circumferential distance or width P of innermost ends of a pair of inside stiffening rib portions of the major-thrust-side skirt portion. Additionally, the position of formation of the minor-thrust-side stiffening rib pair (26, 26) is lower than that of the major-thrust-side stiffening rib pair (25, 25) with respect to the plane (YZ) containing the axial line (Z) of the piston-pin hole. Therefore, even when there is the necessity of the formation of stiffening or reinforcing ribs on the inside wall of the piston for the purpose of ensuring mechanical and thermal strength, while suppressing deformation of the piston, the ribbed piston of the second embodiment can provide the same effects as the piston of the first embodiment. In addition, each of stiffening rib portions formed inside of the piston has a substantially trapezoidal shape in cross section taken in the axial direction of the piston. The thickness of the flat upper face of the major-thrust-side stiffening rib portion is gradually decreased or thin-walled towards the innermost end of the major-thrust-side stiffening rib portion, whereas thickness of the flat upper face of the minor-thrust-side stiffening rib portion is gradually decreased towards the innermost end of the minor-thrust-side stiffening rib portion. This facilitates manufacturing of the piston.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A piston of an internal combustion engine comprising:

a piston crown portion;

a pair of piston pin-boss portions, each integrally formed with said piston crown portion and having a piston-pin hole;

a piston skirt adapted to be in sliding-contact with a cylinder wall, and having a major-thrust-side skirt portion and a minor-thrust-side skirt portion; and a plurality of web-like apron portions, each interconnecting a side edge of either one of the major-thrust-side skirt portion and the minor-thrust-side skirt portion and either one of the pair of piston pin-boss portions;

wherein a projected circumferential width of the minor-thrust-side skirt portion is greater than a projected circumferential width of the major-thrust-side skirt portion, and a minimum thickness of the minor-thrust-side skirt portion is less than a minimum thickness of the major-thrust-side skirt portion.

2. The piston as claimed in claim 1, wherein the minor-thrust-side skirt portion is dimensioned to satisfy an inequality $W/D \geqq 30.8\times(T/D)+0.15$, where W denotes the projected circumferential width of the minor-thrust-side skirt portion, D denotes a cylinder bore, and T denotes the minimum thickness of the minor-thrust-side skirt portion.

3. The piston as claimed in claim 1, wherein each of the major-thrust-side skirt portion and the minor-thrust-side skirt portion comprises a pair of stiffening rib portions integrally formed on an inside wall thereof and being continuous with associated web-like apron portions of the plurality of web-like apron portions, the pair of stiffening rib portions being spaced from each other by a predetermined projected circumferential width in a direction parallel to an axial line of the piston-pin hole, and wherein the pair of stiffening rib portions of the minor-thrust-side skirt portion are located at a lower level than the pair of stiffening rib portions of the major-thrust-side skirt portion with respect to the axial line of the piston-pin hole, and wherein the predetermined circumferential width between the pair of stiffening rib portions of the minor-thrust-side skirt portion is greater than the predetermined circumferential width between the pair of stiffening rib portions of the major-thrust-side skirt portion.

4. The piston as claimed in claim 3, wherein each of the pair of stiffening rib portions of the major-thrust-side skirt portion and the pair of stiffening rib portions of the minor-thrust-side skirt portion has a substantially trapezoidal shape in cross section taken in an axial direction of the piston, and wherein a thickness of each of the pair of stiffening rib portions of the major-thrust-side skirt portion and the pair of stiffening rib portions of the minor-thrust-side skirt portion is gradually decreased towards an innermost end thereof in a circumferential direction of the piston.

5. The piston as claimed in claim 1, wherein said piston crown portion comprises a plurality of piston ring grooves formed in a periphery of said piston crown portion, and which further comprises a slit formed in the back of a lowermost piston ring groove of the plurality of piston ring grooves and located in a side of the piston corresponding to the minor-thrust-side skirt portion so that said slit penetrates a side wall of the piston.

6. The piston as claimed in claim 1, wherein each of the major-thrust-side skirt portion and the minor-thrust-side skirt portion is formed in an oval shape of a predetermined ovality in lateral cross section.

7. The piston as claimed in claim 3, wherein the stiffening rib portions of each of the major-thrust-side skirt portion and the minor-thrust-side skirt portion are symmetrical with respect to a plane containing an axial line of the piston and a line normal to an axial line of the piston-pin hole.

8. The piston as claimed in claim 4, wherein the innermost end of each of the stiffening rib portions of the major-thrust-side skirt portion is formed into a circular-arc shape and continuously smoothly connected to an inside wall surface of the major-thrust-side skirt portion, and the innermost end of each of the stiffening rib portions of the minor-thrust-side skirt portion is formed into a circular-arc shape and continuously smoothly connected to an inside wall surface of the minor-thrust-side skirt portion.

9. A piston of an internal combustion engine comprising:

a piston crown portion;

a pair of piston pin-boss portions, each integrally formed with said piston crown portion and having a piston-pin hole;

a piston skirt adapted to be in sliding-contact with a cylinder wall, and having a major-thrust-side skirt portion and a minor-thrust-side skirt portion; and a plurality of web-like apron portions, each interconnecting a side edge of either one of the major-thrust-side skirt portion and the minor-thrust-side skirt portion and either one of the pair of piston pin-boss portions;

wherein a projected circumferential width of the minor-thrust-side skirt portion is dimensioned to be greater than a projected circumferential width of the major-thrust-side skirt portion to provide a reduced pressure-receiving sliding surface area of the major-thrust-side skirt portion so as to reduce a frictional force imposed on the major-thrust-side skirt portion owing to piston side thrust applied to the major-thrust-side skirt portion, and a minimum thickness of the minor-thrust-side skirt portion is dimensioned to be less than a minimum thickness of the major-thrust-side skirt portion so as to reduce a frictional force created between bearing surfaces of the cylinder wall and the piston skirt owing to thermal expansion, and wherein the minor-thrust-side skirt portion is dimensioned to satisfy an inequality $W/D \geqq 30.8\times(T/D)+0.15$, where W denotes the projected circumferential width of the minor-thrust-side skirt portion, D denotes a cylinder bore, and T denotes the minimum thickness of the minor-thrust-side skirt portion.

10. A piston of an internal combustion engine comprising:

a piston crown portion;

a pair of piston pin-boss portions, each integrally formed with said piston crown portion and having a piston-pin hole;

a piston skirt adapted to be in sliding-contact with a cylinder wall, and having a major-thrust-side skirt portion and a minor-thrust-side skirt portion; and a plurality of web-like apron portions, each interconnecting a side edge of either one of the major-thrust-side skirt portion and the minor-thrust-side skirt portion and either one of the pair of piston pin-boss portions;

wherein a projected circumferential width of the minor-thrust-side skirt portion is dimensioned to be greater than a projected circumferential width of the major-thrust-side skirt portion to provide a reduced pressure-receiving sliding surface area of the major-thrust-side skirt portion so as to reduce a frictional force imposed on the major-thrust-side skirt portion owing to piston side thrust applied to the major-thrust-side skirt portion, and a minimum thickness of the minor-thrust-side skirt portion is dimensioned to be less than a minimum thickness of the major-thrust-side skirt portion so as to reduce a frictional force created between bearing surfaces of the cylinder wall and the piston skirt owing to thermal expansion, and wherein each of the major-thrust-side skirt portion and the minor-thrust-side skirt portion comprises a pair of stiffening rib portions integrally formed on an inside wall thereof and being continuous with associated web-like apron portions of the plurality of web-like apron portions, the pair of stiffening rib portions being spaced from each other by a predetermined projected circumferential width in a direction parallel to an axial line of the piston-pin hole, and wherein the pair of stiffening rib portions of the minor-thrust-side skirt portion are located at a lower level than the pair of stiffening rib portions of the major-thrust-side skirt portion with respect to the axial line of the piston-pin hole, and wherein the predetermined circumferential width between the pair of stiffening rib portions of the minor-thrust-side skirt portion is greater than the predetermined circumferential width between the pair of stiffening rib portions of the major-thrust-side skirt portion.

* * * * *